(12) United States Patent
Takahashi et al.

(10) Patent No.: US 6,328,016 B1
(45) Date of Patent: Dec. 11, 2001

(54) KNOCK SUPPRESSION CONTROL APPARATUS FOR INTERNAL COMBUSTION ENGINE

(75) Inventors: Yasuhiro Takahashi; Koichi Okamura; Mitsuru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/500,478

(22) Filed: Feb. 9, 2000

(30) Foreign Application Priority Data

Sep. 20, 1999 (JP) .................................................. 11-265282

(51) Int. Cl.⁷ .............................. F02P 5/152; G01L 23/22
(52) U.S. Cl. .............................. 123/406.35; 123/406.37; 73/35.04; 73/35.05; 73/35.08
(58) Field of Search .................... 123/406.35, 406.37, 123/435, 406.34, 406.36; 701/111; 73/35.03, 35.04, 35.05, 35.06, 35.08

(56) References Cited

U.S. PATENT DOCUMENTS

| | | | |
|---|---|---|---|
| 5,694,900 | 12/1997 | Morita et al. | 123/425 |
| 5,751,147 | * 5/1998 | Nakata et al. | 73/35.06 |
| 5,803,047 | * 9/1998 | Rask | 123/406.37 |
| 5,992,386 | * 11/1999 | Nytomt et al. | 123/406.37 |

FOREIGN PATENT DOCUMENTS 0 922 948-A1 * 6/1999 (EP) .............................. B60K/26/00

* cited by examiner

Primary Examiner—Andrew M. Dolinar
(74) Attorney, Agent, or Firm—Sughrue, Mion, Zinn, Macpeak & Seas, PLLC

(57) ABSTRACT

A knock suppression control apparatus for an internal combustion engine which can avoid erroneous knock detection and hence the erroneous knock suppression control, to thereby ensure knock suppression control with high reliability. The knock suppression control apparatus includes an ion current detecting means (10) for detecting an ion current (i) flowing by way of a spark plug (8) upon combustion of an air-fuel mixture charged in the cylinder, a filter means (14A) for extracting a knock signal (Kj) from an output signal (Ei) of the ion current detecting means (10), a knock decision means (23) for deciding occurrence of a knock event in the engine on the basis of the knock signal (Kj), a control quantity correcting means (24) for correcting a control quantity for the internal combustion engine so as to suppress the knock event on the basis of result (H) of decision made by the knock decision means (23), an integrating means (16, 16A) for arithmetically determining an integral value (Km; Em) which corresponds to an output level of the ion current (Ei), a comparison level setting means (26, 26A) for setting a predetermined comparison reference level (MR) for the integral value (Km; Em), and a correcting quantity arithmetic means (25, 25A) for outputting a correcting signal (M1; M2) for correcting parameters relevant to the knock decision means (23) or alternatively relevant to the control quantity correcting means (24) on the basis of result of the comparison between the integral value (Km; Em) and the comparison reference level (MR).

14 Claims, 4 Drawing Sheets

KNOCK SUPPRESSION CONTROL APPARATUS FOR INTERNAL COMBUSTION ENGINE

BACKGROUND OF THE INVENTION

1. Field of the Invention

The present invention relates to a knock suppression control apparatus for an internal combustion engine, which apparatus is so arranged as to detect occurrence of knocking or knock event in the engine on the basis of level change of an ion current which flows by way of a spark plug upon combustion of an air-fuel mixture within a cylinder of the engine to thereby correct an engine control quantity so that occurrence of such knock event can be suppressed. More particularly, the present invention is concerned with a knock suppression control apparatus for an internal combustion engine, which apparatus is designed to avoid erroneous detection of the knock event notwithstanding of change or variation of the ion current which may be brought about due to retrofitting of the spark plugs and/or compositional difference of the air-fuel mixture charged in the engine cylinders and/or sooting state of the spark plug, to thereby ensure the knock suppression control with high reliability.

2. Description of Related Art

Heretofore, in the knock suppression control apparatus for the internal combustion engine, the control quantity or quantities for the engine have been so corrected as to suppress knock occurrence (e.g. by retarding the ignition timing, a typical one of engine control quantities) upon detection of the knock event in an effort to protect the engine against damage or injury due to the occurrence of knock event.

Further, the knock suppression control apparatus for the internal combustion engine in which the ion current flowing across the electrodes of the ignition plug is utilized for detecting the knock event can certainly detect occurrence of the knock on a cylinder-by-cylinder basis without resorting to any particular sensor dedicated for the knock detection, which is of course advantageous from the standpoint of cost reduction. For this reason, there have heretofore been proposed various types of knock suppression control apparatuses which can operate on the basis of the ion current.

In general, in the internal combustion engine, an air-fuel mixture charged into a combustion chamber defined within each of the engine cylinders is compressed by a piston moving reciprocatively within the cylinder, and a high voltage is applied to the spark plug disposed within the cylinder and exposed to the combustion chamber, whereby a spark is generated between the electrodes of the spark plug due to electric discharge. Thus, combustion of the compressed air-fuel mixture is triggered. Explosion energy resulting from the combustion is then converted into every for motion of the piston in the direction reverse to that in the compression stroke, which motion is translated into an output torque of the engine taken out therefrom via a crank shaft.

Upon combustion of the compressed air-fuel mixture within the combustion chamber in the engine cylinder, molecules prevailing within the combustion chamber are ionized. Thus, when a high voltage is applied to an ion current detecting electrode which is constituted by one of the electrodes of the spark plug, migration of ions carrying electric charges takes place between both the electrodes of the spark plug, which gives rise to flow of the ion current.

As is known in the art, magnitude of the ion current varies with a high sensitively in dependence on variation of the pressure prevailing within the combustion chamber and thus the ion current carries vibration components which are ascribable to the knock event. Thus, it is possible to decide on the basis of the ion current whether the knock event has occurred or not.

For having better understanding of the present invention, description will first be made of the technical background thereof in some detail. FIG. 3 is a circuit diagram showing generally and schematically a structure of a hitherto known or conventional knock suppression control apparatus for an internal combustion engine which is disclosed, for example, in Japanese Unexamined Patent Application Publication No. 9108/1998 (JP-A-10-9108). In the apparatus shown in FIG. 3, a high voltage is applied distributively to spark plugs of individual engine cylinders, respectively, through the medium of a distributor 7.

The conventional apparatus shown in FIG. 3 is so designed as to extract vibration components ascribable to the knock event and superposed on an ion current i for counting knock pulses which are resulted from waveform shaping of the knock vibration components, to thereby make knock decision (i.e., decision as to occurrence or non-occurrence of the knock event) on the basis of the number of the counted pulses (hereinafter also referred to as the pulses number).

Referring to FIG. 3, there is provided in association with a crank shaft (not shown) of an internal combustion engine (not shown either, hereinafter also referred to simply as the engine) a crank angle sensor 1 designed to output a crank angle signal SGT which contains a number of pulses generated at a frequency depending on a rotation number or speed (rpm) of the engine.

The leading edges of the individual pulses contained in the crank angle signal SGT indicate reference positions for the individual engine cylinders (not shown) in terms of the crank angles, respectively. The crank angle signal SGT is supplied to an electronic control unit (ECU) 2 which includes by a microcomputer or the like to be used for performing various controls as well as arithmetic operations therefor.

More specifically, the electronic control unit (ECU) 2 further includes a counter 21 for counting the number of pulses (also referred to as the pulses number) N of a knock pulse train Kp inputted from a waveform processing means (described later on) and a CPU (central processing unit) 22 constituting a major part of the microprocessor for deciding occurrence or non-occurrence of the knock on the basis of the pulses number N.

The counter 21, the CPU 22 and the waveform processing means cooperate to serve as a knock detecting means.

The electronic control unit 2 is so designed or programmed as to fetch the engine operation information signals from various sensors (not shown) in addition to the crank angle signal SGT outputted from the crank angle sensor 1 and execute various arithmetic operations in dependence on the engine operation states, to thereby generate driving signals for a variety of actuators and devices inclusive of an ignition coil 4 and others.

An ignition signal P for driving the ignition coil 4 is applied to a base of a power transistor TR connected to a primary winding 4a of the ignition coil 4 for turning on/off the power transistor TR. More specifically, the power transistor TR is turned of f in response to the driving signal P, whereby a primary current i1 flowing through the primary winding of the ignition coil 4 is interrupted.

Upon interruption or breaking of the primary current i1, the primary voltage v1 making appearance across the primary winding 4a rises up steeply, as a result of which a secondary voltage v2 further boosted up is induced in a secondary winding 4b of the ignition coil 4 and makes appearance thereacross as a voltage of high level for ignition, which voltage is usually on the order of several ten kilovolts. Hereinafter, this voltage will also be referred to as the high ignition voltage or simply as the ignition voltage. In this manner, the ignition coil 4 generates the secondary voltage V2 (high ignition voltage) in conformance with the ignition timing of the engine.

The distributor 7 which is connected to an output terminal of the secondary winding 4b operates to apply distributively and apply the secondary voltage V2 sequentially to spark plugs 8a, . . . , 8d installed in the engine cylinders, respectively, in synchronism with the rotation of the engine, whereby spark discharges take place within the combustion chambers defined in the engine cylinders, respectively, triggering combustion or burning of the air-fuel mixture confined within the combustion chamber.

More specifically, with the spark discharges occurring across the spark plugs 8a, . . . , 8d in response to the application of the secondary voltage V2 in conformance with the ignition timing of the engine, the air-fuel mixture within the cylinders is fired or ignited.

Connected between one end of the primary winding 4a of the ignition coil 4 and the ground is a series circuit which is composed of a rectifier diode D1, a current limiting resistor R, a capacitor 9 connected in parallel with a Zener diode DZ serving for voltage limiting function, and a rectifier diode D2. The series circuit mentioned above constitutes a path for allowing a charging current to flow to the capacitor 9 which constitutes a bias voltage source for applying a bias voltage to one electrode of the spark plug for detecting the ion current.

More specifically, the capacitor 9 connected in parallel with the Zener diode DZ is electrically charged to a voltage level corresponding to a predetermined bias voltage VBi which is ordinarily on the order of several hundred volts by the charging current which flows under the primary voltage V1. Thus, the capacitor 9 serves as the bias voltage source for detecting the ion current i, as mentioned above. To this end, the capacitor 9 is so connected as to electrically discharge by way of the spark plug (8a, . . . , 8d) immediately after the ignition, allowing thus the ion current i to flow through the spark plug.

Connected to one end of the capacitor 9 are anodes of high-voltage diodes 11a, . . . , 11d, respectively, which have respective cathodes connected to one electrodes of the spark plugs 8a, . . . , 8d, respectively, with a same polarity as that of the firing or ignition voltage. On the other hand, connected to the other end of the capacitor 9 is a resistor 12 for detecting the ion current, which serves to convert the ion current i into a voltage signal and output it as an ion current detection voltage signal Ei.

The resistor 12 is connected to the other ends of the spark plugs 8a, . . . , 8d, respectively, via the ground and forms a path for the ion current i in cooperation with the capacitor 9 and the high-voltage diode 11a, . . . , 11d.

The ion current detection voltage signal Ei derived from the resistor 12 is shaped by a waveform shaper circuit 13 which thus outputs a waveform-shaped signal Fi. Subsequently, only the knock signal Ki is extracted from the waveform-shaped signal Fi through a band-pass filter 14. The knock signal Ki is then converted into a knock pulse train Kp through a comparison circuit 15 to be ultimately supplied to the counter 21 incorporated in the electronic control unit (ECU) 2.

The waveform shaper circuit 13, the band-pass filter 14 and the comparison circuit 15 cooperate to constitute a waveform processing means for extracting the knock pulse train Kp from the ion current detection voltage signal Ei.

The pulses number N of the knock pulses contained in the pulse train Kp is counted by the counter 21 of the electronic control unit 2 to be used for allowing the CPU (central processing unit) 22 to make decision as to whether the knock event occurs or not.

The pulses number N of the knock pulse train Kp bears a significant correlation with the intensity or magnitude of the knock. In other words, the pulses number N increases, as the magnitude of knock is larger.

Now, referring to FIG. 4 along with FIG. 3, operation of the conventional knock suppression control apparatus for the internal combustion engine will be described.

FIG. 4 is a timing chart for illustrating waveforms of the various signals mentioned above by reference to FIG. 3. It can be seen from FIG. 4 that the knock signal is superposed on the ion current i (see waveform-shaped signal Fi).

The electronic control unit 2 outputs the ignition signal P for turning on/off the power transistor TR on the basis of the crank angle signal SGT derived from the output signal of the crank angle sensor 1. The power transistor TR electrically conducts (i.e., assumes ON-state) when the ignition signal P is at a high or "H" level, to thereby allow the primary current i1 to flow through the primary winding 4a of the ignition coil 4, while interrupting the current i1 at the time point when the ignition signal P changes from the "H" level to a low or "L" level.

Upon interruption of the primary current i1, the primary voltage V1 rising steeply is induced in the primary winding 4a, as a result of which the capacitor 9 is charged with the current flowing along the charging path constituted by the rectifier diode D1, the current limiting resistor R, the capacitor 9 and the rectifier diode D2. Needless to say, charging of the capacitor 9 is terminated when the voltage appearing across the capacitor 9 has reached the level corresponding to the backward breakdown voltage of the Zener diode DZ, which voltage in turn corresponds to the bias voltage VBi.

In this manner, the capacitor 9, the Zener diode DZ and the diode D2 cooperate to constitute a bias means, wherein the capacitor 9 is charged under the effect of the high voltage making appearance at the low voltage side of the primary winding 4a upon interruption of the primary current i1.

When the primary voltage V1 is induced in the primary winding 4a as mentioned above, there is induced in the secondary winding 4b of the ignition coil 4 the secondary voltage V2 which is boosted up to a high ignition voltage on the order of several ten kilovolts. This secondary voltage V2 is applied distributively to the spark plugs 8a, . . . , 8d of the individual engine cylinders, respectively, by means of the distributor 7, which results in generation of the spark discharge at the plugs within the combustion chambers of the engine cylinders which are under control. Thus, the air-fuel mixture undergoes burning or combustion.

Upon combustion of the air-fuel mixture, ions are produced within the combustion chamber defined in the engine cylinder. The ion current i can thus flow under the bias voltage VBi charged in the capacitor 9. By way of example, let's assume that combustion of the air-fuel mixture takes place within the combustion chamber in which the spark plug 8a is disposed. Then, the ion current i flows along the current path extending from the capacitor 9 to the resistor 12 by way of the diode 11a and the spark plug 8a and then to the capacitor 9, as mentioned previously.

The ion current i is converted to the ion current detection voltage signal Ei by means of the resistor 12 (serving as the ion current detecting means), whereon the ion current detection voltage signal Ei is shaped to the signal Fi (FIG. 4) by means of the shaper circuit 13.

As can be seen in FIG. 4, the shaped signal Fi is of such waveform which allows the knock signal Ki to be easily extracted by clipping only the ion current component at a predetermined voltage level.

When a knock event occurs in the engine, signal components ascribable to the knocking vibrations are superposed on the ion current i. Thus, the shaped signal Fi assumes a waveform in which the knocking vibration components are superposed on the ion current.

The shaped signal Fi is supplied to the band-pass filter 14 and the comparison circuit 15 which constitute the waveform processing means.

Thus, the band-pass filter 14 selectively extracts only the knock signal Ki indicative of the knocking vibration frequency. On the other hand, the comparison circuit 15 compares the knock signal Ki with a predetermined reference level. As a result, the knock pulse train Kp is outputted from the comparison circuit 15 to be supplied to the counter 21 which is incorporated in the electronic control unit (ECU) 2.

The counter 21 of the electronic control unit 2 is designed to count the pulses number N of the knock pulse train Kp in response to a leading (rising or falling) edge thereof. The signal indicating the pulses number is then inputted to the CPU 22.

The pulses number N increases as the magnitude of the knock becomes larger. Thus, the CPU 22 of the electronic control unit 2 can decide or determine not only the occurrence or non-occurrence of the knock event but also the magnitude thereof on the basis of the pulses number N. By virtue of this feature, the control quantity (ignition timing) can be so corrected as to suppress the knock event on the basis of the pulses number N.

By way of example, when a count value of the pulses number N becomes equal to or greater than a predetermined number, occurrence of the knock event is decided. In that case, the ignition timing (the timing at which the primary current i1 is interrupted) is correctively retarded by a predetermined quantity. Subsequently, so long as the occurrence of the knock event is still decided in succession, the retard quantity is progressively incremented until no occurrence of the knock event is decided.

The predetermined pulses number which is used as the reference value for comparison for the knock decision, as described previously, can be set to a value within a range of e.g. 5 to 20, although it depends on the engine rotation number and the waveform shaping level set in the comparison circuit 15.

In this way, by determining the retard quantity for retarding correctively the ignition timing in dependence on the result of decision made by the CPU 22, the ignition timing for the cylinder in which the knock has occurred can be corrected optimally, whereby occurrence of the knock event can be suppressed effectively.

At this juncture, it should be mentioned that the fuel is often admixed with an additive containing easily ionizable materials or substances such as Na (sodium), K (potassium) and/or the like in an effort to increase the engine power (output torque of the engine) as is known in the art. In that case, not only the ions produced upon combustion of the air-fuel mixture but also the ions produced due to ionization of the admixed substances themselves are detected simultaneously.

As a consequence, the ion current detection signal Ei will assume an increased level when compared with the case where the ordinary fuel containing no ionizable substances such as mentioned above is used. Consequently, the amplitude of the high-frequency vibration component (knock signal Ki) derived through the band-pass filter 14 will naturally increase, as a result of which noise components contained in the knock signal Ki will increase substantially proportionally to the knock components.

Further, it should also be mentioned that the amplitudes of the ion current detection voltage signal Ei and the knock signal Ki increase or decrease when the geometrical or structural factors of the spark plug 8a, . . . , 8d such as the shape of the electrodes thereof, inter-electrode distance and the like change of course, variation (increase or decrease) of the ion current detection voltage signal Ei due to the structural change of the electrodes of the spark plug is small when compared with the case where the fuel admixed with the additive containing the ionizable substance mentioned above is used. Parenthetically, such structural or geometrical change of the spark plug may be explained by the exchange of the originally installed spark plug (hereinafter referred to as the standard spark plug only for convenience of the description) by a fresh one (hereinafter also referred to as the nonstandard spark plug), i.e., by retrofitting of the spark plug.

In any case, when the spark plug 8a, . . . , 8d is replaced by a commercially available nonstandard plug which differs from the originally installed standard one or when the fuel admixed with the additive containing easily ionizable substances such as mentioned above is used, the amplitude of the knock signal Ki will assume different level or value when compared with the case where the standard spark plugs are employed or where the fuel containing no ionizable substance such as Na, K or the like is used.

However, in the conventional knock suppression control apparatuses, no measures are taken for coping with such amplitude variations or changes of the knock signal Ki as mentioned above.

Additionally, it should be mentioned that when the spark plug 8a, . . . , 8d is in the sooting state in which an insulation resistance value of the plug gap through which the ion current flows is low, a leak current of the magnitude which is determined by the insulation resistance value and the bias voltage VBi can flow through the plug gap, as a result of which the ion current i which contains the leak current component will be detected. In other words, when the sooting state prevails at the spark plug, reliability of detection of the ion current i will become degraded more or less.

As will now be appreciated, when the fuel admixed with the additive containing the easily ionizable material(s) or substance(s) is used or when the standard spark plug is replaced by a nonstandard spark plug which differs from the former in respect to the geometrical configuration, great difficulty will be encountered in realizing in a satisfactory manner the knock detection and the knock suppression control with the conventional knock suppression control apparatus while maintaining the hardware/software structures thereof as they are, i.e., without changing or modifying the hardware/software structure of the knock suppression control apparatus.

As is apparent from the foregoing description, the conventional knock suppression control apparatus for the internal combustion engine can certainly perform the knock suppression control on the basis of the ion current i. However, the knock suppression control apparatus known heretofore suffers a problem that erroneous knock detection and hence erroneous knock suppression control will be incurred due to level variation of the ion current detection voltage signal Ei when the fuel admixed with the additive containing easily ionizable substance(s) or when the standard spark plug is replaced by a non-standard one or when the sooting state occurs in the spark gap of the spark plug.

SUMMARY OF THE INVENTION

In the light of the state of the art described above, it is an object of the present invention to provide a knock suppression control apparatus for an internal combustion engine, which apparatus can avoid the problems of the conventional knock suppression control apparatus such as mentioned above.

In more concrete, it is an object of the present invention to provide a knock suppression control apparatus for an internal combustion engine which is equipped with facility for correcting the knock signal in dependence on change or variation of the magnitude of the ion current brought about by replacement of a standard spark plug by a nonstandard one having structure or electrode(s) structurally different from that of the former or by use of a fuel admixed with an additive containing ionization-susceptible material(s) or substance(s), to thereby ensure high reliability for knock detection and knock suppression control.

Another object of the present invention is to provide a knock suppression control apparatus for an internal combustion engine which can ensure the knock detection as well as the knock suppression control with enhanced reliability notwithstanding of occurrence of sooting state at the spark plug of the engine.

In view of the above and other objects which will become apparent as the description proceeds, there is provided according to a general aspect of the present invention a knock suppression control apparatus for an internal combustion engine including at least one cylinder, an ignition circuit for generating a high ignition voltage in conformance with ignition timing, and a spark plug disposed within the cylinder for generating spark discharge within the cylinder upon application of the high ignition voltage, wherein the knock suppression control apparatus includes an ion current detecting means for detecting an ion current flowing by way of the spark plug upon combustion of an air-fuel mixture charged in the cylinder, a filter means for extracting a knock signal from an output signal of the ion current detecting means, a knock decision means for deciding occurrence of a knock event in the engine on the basis of the knock signal, a control quantity correcting means for correcting a control quantity for the internal combustion engine so as to suppress the knock event on the basis of result of decision made by the knock decision means, an integrating means for arithmetically determining an integral value which corresponds to an output level of the ion current, a comparison level setting means for setting a predetermined comparison reference level for the integral value, and a correcting quantity arithmetic means for outputting a correcting signal for correcting parameters relevant to the knock decision means or alternatively relevant to the control quantity correcting means on the basis of result of the comparison between the integral value and the comparison reference level.

By virtue of the arrangement of the knock suppression control apparatus described above, erroneous knock suppression control based on erroneous knock decision can be prevented or suppressed satisfactorily even when the amplitude of the knock signal changes due to variation of the ion current which may be brought about by retrofitting of a nonstandard spark plug in place of the standard plug or by the admixture of an additive containing ionizable substance (s) with the fuel. Thus, there is provided the knock suppression control apparatus for an internal combustion engine which can ensure improved knock detecting function as well as reliable knock suppression control, to a great advantage.

In a preferred mode for carrying out the invention, the aforementioned integrating means may be comprised of a first integrating means for arithmetically determining an integral value of the knock signal as a first integral value, and a second integrating means for arithmetically determining an integral value of the ion current as a second integral value, wherein the comparison level setting means may be so designed as to set first and second comparison reference levels for the first and second integral values, respectively, and the correcting quantity arithmetic means may be so designed as to output the correcting signal at least on the basis of result of the comparison between the first integral value and the first comparison reference level or alternatively at least on the basis of result of the comparison between the second integral value and the second comparison reference level.

With the arrangement of the knock suppression control apparatus mentioned above, further improved knock detecting function and reliable knock suppression control can be realized for the internal combustion engine.

In another preferred mode for carrying out the invention, the knock suppression control apparatus may further include a sooting state detecting means for detecting a sooting state of the spark plug on the basis of a current signal detected by the ion current detecting means during a period in which the ion current is not detected, wherein the correcting quantity arithmetic means may be so designed as to output the correcting signal on the basis of the aforementioned second integral value so long as the sooting state of the spark plug is not detected, while outputting the correcting signal on the basis of the aforementioned first integral value so long as the sooting state of the spark plug is detected.

Owing to the arrangement described above, the knock detection and the knock suppression control can be performed with high stability and reliability even when the sooting state takes place at the spark plug.

In yet another preferred mode for carrying out the invention, the sooting state detecting means may be so designed as to inhibit a knock decision performed by the knock decision means when the current signal exceeds a predetermined upper-limit level while setting the correcting quantity determined by the control quantity correcting means to a predetermined quantity.

With the arrangement described above, improved knock detecting function and reliable knock suppression control can equally be ensured for the internal combustion engine.

In still another preferred mode for carrying out the invention, the knock decision means may be so designed as to decide that the internal combustion engine is in a knock state when the first integral value exceeds a knock decision reference level.

With the arrangement of the knock suppression control apparatus mentioned above, the first integral value can be employed for generating both of the aforementioned correcting quantities, whereby the knock suppression control apparatus can be implemented in a simplified structure with reduction in cost.

In a further preferred mode for carrying out the invention, the knock suppression control apparatus may further include a first averaging means for arithmetically determining a first mean integral value by averaging the aforementioned first integral value, and a second averaging means for arithmetically determining a second mean integral value by averaging the aforementioned second integral value, wherein the correcting quantity arithmetic means may be so designed as to determine arithmetically the correcting quantities indicated by the correcting signals on the basis of addition of a first comparison-resultant value corresponding to a ratio or difference between the first mean integral value and the first comparison reference level on one hand and a second comparison-resultant value corresponding to a ratio or difference between the second mean integral value and the second comparison reference level on the other hand.

With the arrangement of the knock suppression control apparatus mentioned above, the knock detecting function and the knock suppression control for the internal combustion engine can further be improved.

In a yet further preferred mode for carrying out the invention, the correcting quantity arithmetic means may be so designed as to determine arithmetically the correcting quantity by adding products resulting from multiplications of the first and second comparison-resultant values by mutually different coefficients, respectively.

Owing to the arrangement of the knock suppression control apparatus mentioned above, one of the first and second comparison values which ensures higher reliability can be reflected in the knock detection and the knock suppression control at a higher ratio.

In a still further preferred mode for carrying out the invention, the correcting quantity arithmetic means may be so designed as to increase correctively the knock decision reference level of the knock decision means with the correcting signal when the integral value reaches or exceeds the comparison reference level.

With the arrangement of the knock suppression control apparatus mentioned above, stable and reliable knock detecting function and knock suppression performance can be realized even in the case where the level of the ion current increases due to variation in the composition of the fuel.

In a preferred mode for carrying out the invention, the correcting quantity arithmetic means may be so designed as to decrease correctively the knock decision reference level of the knock decision means with the correcting signal when the integral value is smaller than the comparison reference level.

Owing to the arrangement of the knock suppression control apparatus mentioned above, stable and reliable knock detecting function and knock suppression performance can be realized even in the case where the level of the ion current lowers due to the retrofit of the standard spark plug with a nonstandard one.

In another preferred mode for carrying out the invention, the filter means may be comprised of an amplifier means for amplifying the knock signal, wherein the correcting quantity arithmetic means may be so designed as to decrease correctively gain of the amplifier means with the correcting signal when the integral value reaches or exceeds the comparison reference level.

With the arrangement of the knock suppression control apparatus mentioned above, stable and reliable knock detecting function and knock suppression performance can be realized even in the case where the level of the ion current increases due to variation in the composition of the fuel.

In yet another preferred mode for carrying out the invention, the filter means may be comprised of an amplifier means for amplifying the knock signal, wherein the correcting quantity arithmetic means may be so designed as to increase correctively gain of the amplifier means with the correcting signal when the integral value is smaller than the comparison reference level.

Owing to the arrangement of the knock suppression control apparatus mentioned above, stable and reliable knock detecting function and knock suppression performance can be realized even in the case where the level of the ion current lowers due to the retrofit of the standard spark plug with a nonstandard one.

In still another preferred mode for carrying out the invention, the correcting quantity arithmetic means may be so designed as to set variably the correcting quantity based on the correcting signals in dependence on a comparison-resultant value corresponding to a ratio or difference between the comparison reference level and the integral value.

With the arrangement of the knock suppression control apparatus mentioned above, the knock detecting function and knock suppression control for the internal combustion engine can be realized with much enhanced reliability.

In a further preferred mode for carrying out the invention, the comparison level setting means may include map data corresponding to at least engine rotation numbers (rpm) and loads of the internal combustion engine to thereby set variably the comparison reference level by referencing the map data.

With the arrangement of the knock suppression control apparatus mentioned above, improved knock detecting function and reliable knock suppression control can be ensured for the internal combustion engine while simplifying arithmetic processing involved in the control.

In a yet further preferred mode for carrying out the invention, the comparison level setting means may be so designed as to set variably the comparison reference level in dependence on an engine operation state indicated at least by temperature information of the engine.

With the arrangement of the knock suppression control apparatus mentioned above, the knock detecting function and the knock suppression control for the internal combustion engine can further be enhanced because the engine operation state is additionally taken into consideration in the control.

In a still further preferred mode for carrying out the invention, the comparison level setting means may be so designed as to decrease correctively the comparison reference level when the temperature information indicates temperature rise of the engine.

With the arrangement of the knock suppression control apparatus mentioned above, the knock detecting function and the knock suppression control for the internal combustion engine can further be improved.

In a further preferred mode for carrying out the invention, the knock suppression control apparatus may further include an averaging means for arithmetically determining a mean integral value by averaging the aforementioned integral value, wherein the correcting quantity arithmetic means may be so designed as to output the correcting signals on the basis of result of comparison between the mean integral signal and the comparison reference level.

With the arrangement of the knock suppression control apparatus mentioned above, further improvement of the knock detecting function and the knock suppression control for the internal combustion engine can be achieved.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
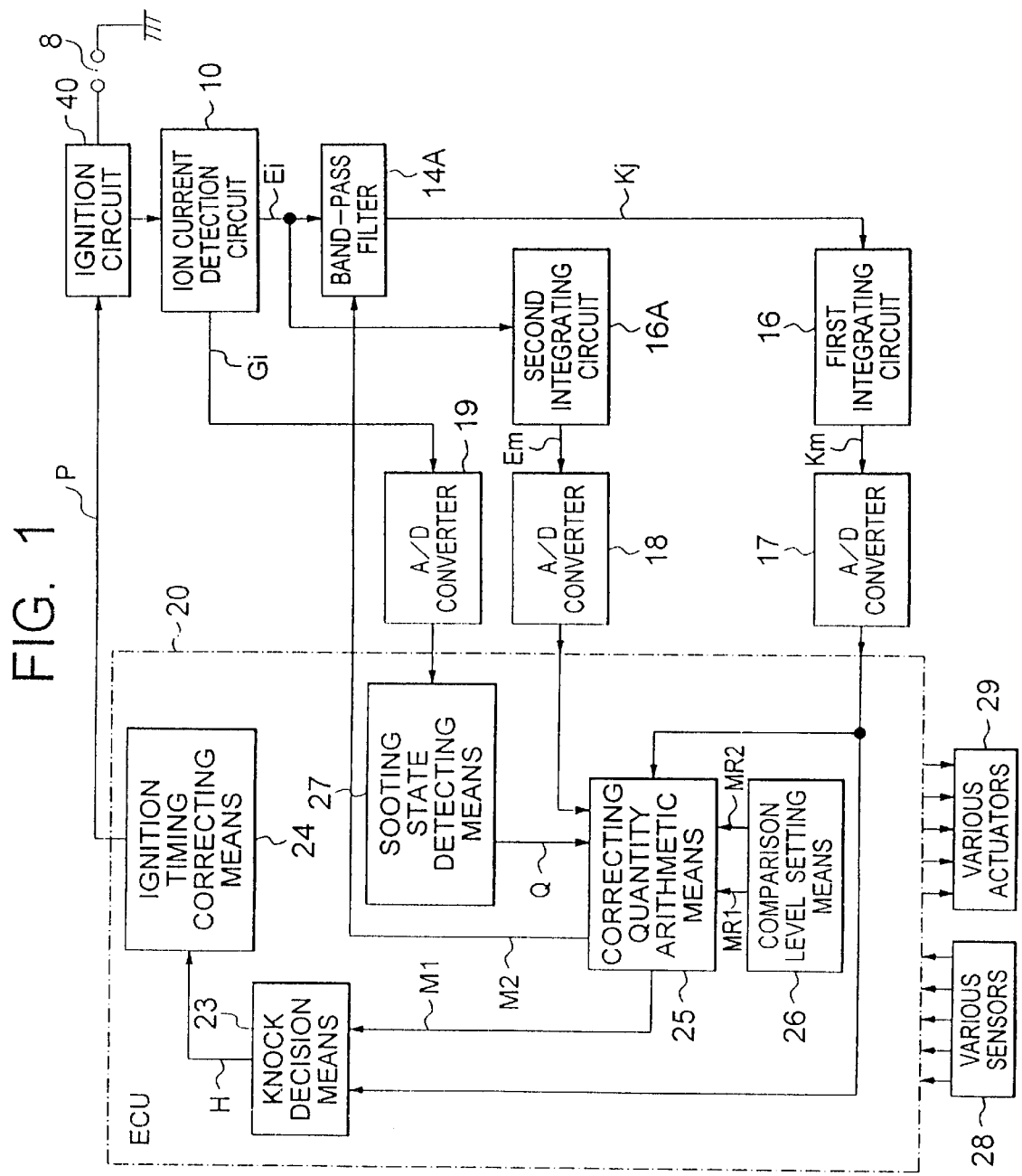
FIG. 1 is a schematic diagram showing generally an arrangement of a knock suppression control apparatus for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a schematic diagram showing generally an arrangement of a knock suppression control apparatus for an internal combustion engine according to a first embodiment of the present invention. In the figure, components like as or equivalent to those described hereinbefore by reference to FIG. 3 are designated by like reference characters and repeated description in detail of these components is omitted.

Figure 3:
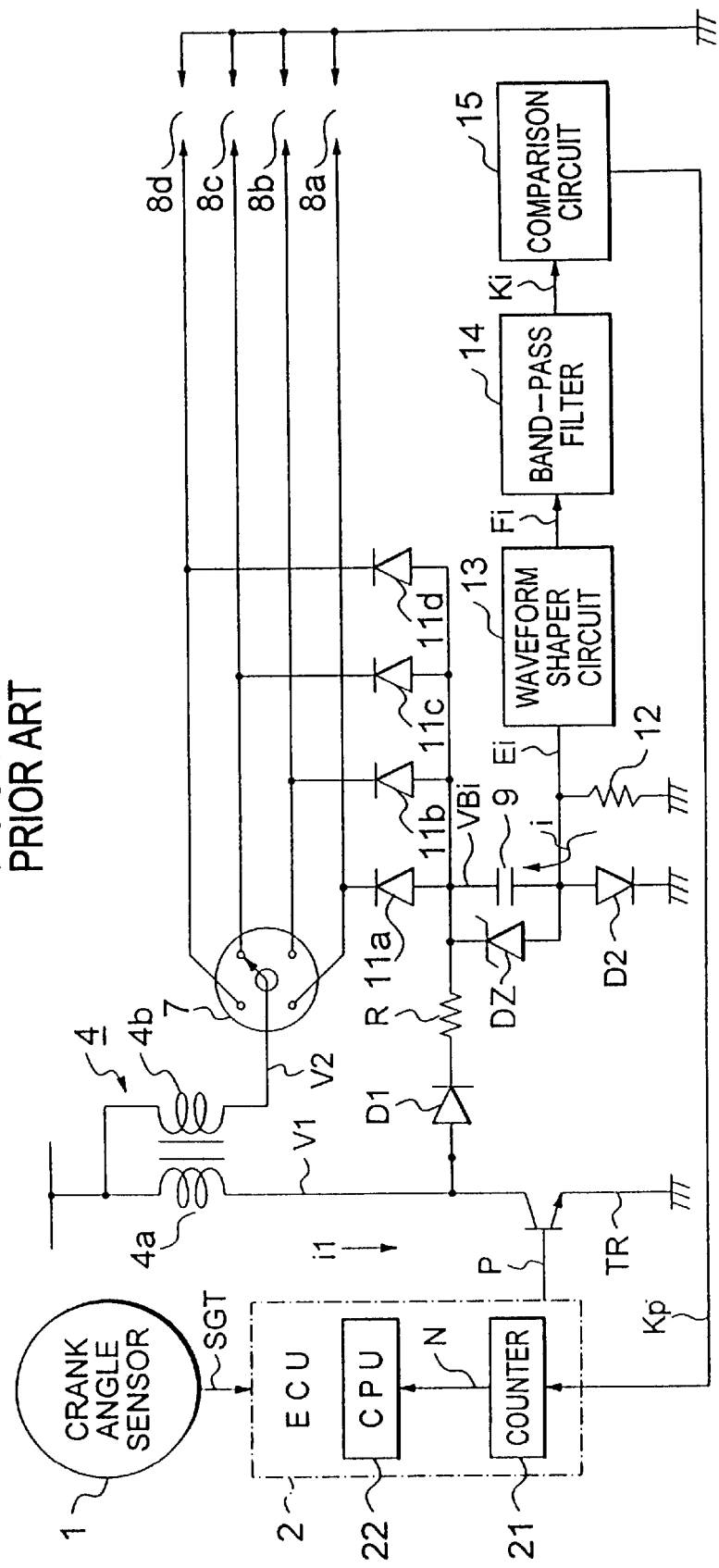
FIG. 3 is a block diagram showing generally a configuration of a conventional knock suppression control apparatus for an internal combustion engine.
Figure 4:
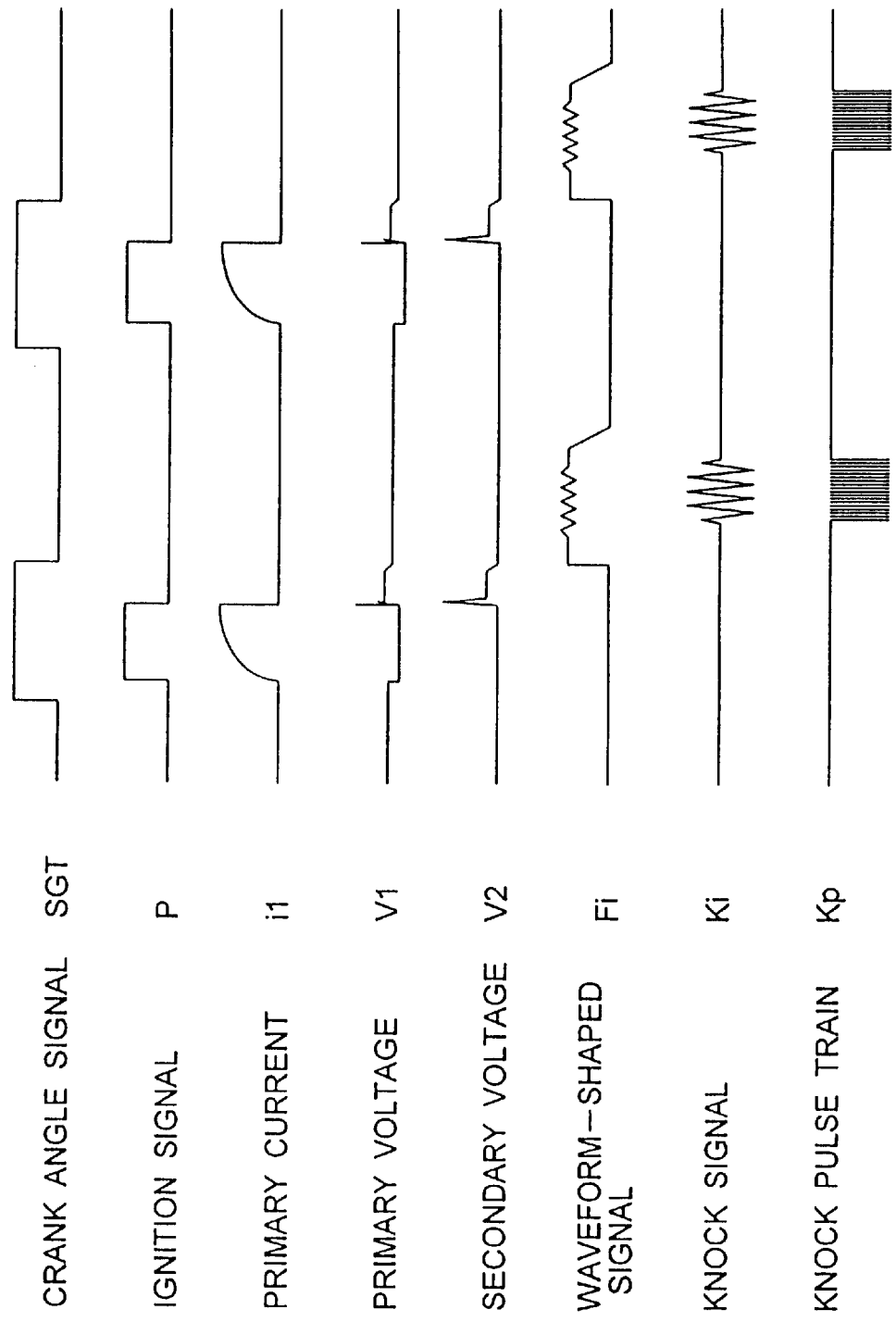
FIG. 4 is a signal waveform/timing diagram for illustrating operation of the conventional knock suppression control apparatus.

Referring to FIG. 1, an electronic control unit (ECU) 20 is constituted by a microcomputer or a microprocessor incorporating a CPU (central processing unit) as in the case of the electronic control unit 2 described hereinbefore by reference to FIG. 3. Additionally, it should be understood that although only one ignition plug 8 is shown in FIG. 1, representatively, this is only for convenience of the description and that the present invention is never restricted to any specific number of the spark plugs.

An ignition unit or circuit 40 is comprised of a power transistor TR, an ignition coil 4, a distributor 7 and others, as described hereinbefore by reference to FIG. 3. Further, an ion current detection circuit 10 is comprised of a capacitor 9, a resistor 12 and others in such manner as described previously by reference to FIG. 3.

A band-pass filter 14A includes an amplifier circuit and is so designed as to extract an amplified knock signal Kj from an ion current detection voltage signal Ei outputted from the ion current detection circuit 10.

Provided at the output side of the band-pass filter 14A is a first integrating circuit 16 for integrating the knock signal Kj to thereby generate a first integral signal Km which is converted into a digital signal by means of an A/D converter 17 to be subsequently supplied to the electronic control unit (ECU) 20. In that case, the electronic control unit (ECU) 20 is so designed or programmed as to perform knock decision (i.e., decision concerning occurrence of knock event) on the basis of the first integral signal Km of the knock signal Kj extracted from the ion current detection voltage signal Ei. At this juncture, it is to be mentioned that reference character Km is used for designating the first integral value and the signal representing the integral value only for convenience of the description.

On the other hand, a second integrating circuit 16A which is provided at the output side of the ion current detection circuit 10 is designed to integrate the ion current detection voltage signal Ei to thereby determine a second integral value Em which corresponds to the output level of the ion current. An A/D (analogue-to-digital) converter 18 provided at the output side of the second integrating circuit 16A serves to convert the signal representing the second integral value Em into a digital signal which is then inputted to the electronic control unit (ECU) 20. Incidentally, it is to be mentioned that reference character Em is used for designating the second integral value and the signal representing the integral value only for convenience of the description.

An A/D (analogue-to-digital) converter 19 which is provided at the output side of the ion current detection circuit 10 is serves for converting a current signal Gi detected by the ion current detection circuit 10 into a digital signal during the period exclusive of that of the explosion stroke in which the ion current detection voltage signal Ei is not intrinsically generated. The digital signal is then inputted to the electronic control unit 20.

The electronic control unit 20 is comprised of a knock decision means 23, an ignition timing correcting means 24, a correcting quantity arithmetic means 25, a comparison level setting means 26 and a sooting state detecting means 27.

The knock decision means 23 includes a means for determining arithmetically a background level (knock decision reference level) on the basis of a digital data value of the first integral signal Km in order to make decision as to the knock state on the basis of the digitized first integral signal Km, wherein the knock decision means 23 is so designed or programmed as to generate a signal indicative of the decision result H that the knock state is prevailing when the first integral signal Km reaches or exceeds the background level.

The ignition timing correcting means 24 is so designed or programmed as to retard correctively the ignition timing (a typical one of the engine control quantities) to thereby suppress the knock event in dependence on the decision result H issued by the knock decision means 23.

On the other hand, the correcting quantity arithmetic means 25 is so designed or programmed as to determine discriminatively the output level of the ion current on the basis of the first integral signal Km (outputted from the A/D converter 17 or the second integral signal Em outputted from the A/D converter 18. The comparison level setting means 26 is so designed or programmed as to set a first comparison reference level MR1 and a second comparison reference level MR2 for the first integral signal Km and the second integral signal Em, respectively.

More specifically, the correcting quantity arithmetic means 25 outputs the correcting signal M1 or M2 for suppressing erroneous detection due to increase of the ion current level when the level of the first integral signal Km reaches or exceeds the first comparison reference level MR1 or when the level of the second integral value Em reaches or exceeds the second comparison reference level MR2.

The sooting state detecting means 27 is so designed or programmed as to issue a sooting state detection signal Q indicating the sooting state of the spark plug 8 when the digitized current signal Gi supplied by way of the A/D converter 19 reaches or exceeds the background level (i.e., when the leak current is detected, to say in another way).

On the other hand, when the sooting state of the spark plug 8 is not detected with the sooting state detection signal Q remaining at off-level (e.g. low level), indicating non-occurrence of the leak current, the correcting quantity arithmetic means 25 outputs the correcting signals Ml and M2 on the basis of the second integral value Em of the ion current detection signal Ei.

In other words, unless the spark plug 8 is in the sooting state with the leak current Li being essentially zero, the second integral value Em of the ion current detection voltage signal Ei will represent the ion current with high fidelity. Thus, the correcting quantity arithmetic means 25 arithmetically determines the correcting quantity on the basis of the second integral value Em.

By contrast, when the sooting state of the spark plug 8 is detected with the sooting state detection signal Q assuming on-level (e.g. high level), the correcting quantity arithmetic means 25 outputs the correcting signals M1 and M2 on the basis of the first integral signal Km of the knock signal Kj.

More specifically, when the spark plug 8 is in the sooting state in which the leak current flows due to lowering of the an insulation resistance of the plug gap of the spark plug 8, this means that the leak current component is superposed on the second integral value Em of the ion current detection voltage signal Ei. In that case, the correcting quantity arithmetic is carried out on the basis of the first integral signal Km while inhibiting or disabling the correcting quantity arithmetic based on the second integral value Em.

Further, the correcting quantity arithmetic means 25 is adapted to set variably the correcting quantities based on the correcting signals M1 and M2 in dependence on the comparison-resultant values which are given, respectively, by a ratio (or difference) between the comparison reference level MR1 and the first integral signal Km on one hand and a ratio (or difference) between the comparison reference level MR2 and the second integral value Em on the other hand.

In this conjunction, the comparison level setting means 26 may preferably be equipped with map data (e.g. table data) prepared by taking into consideration at least the engine rotation number (rpm) and/or the engine load so that the comparison reference levels MR1 and MR2 can variably be set by referencing the map data with the engine rotation number (rpm) and/or the engine load being used as the index parameter(s). In that case, the reliability of the correcting quantity arithmetic can be enhanced significantly.

Additionally, the comparison level setting means 26 may be so designed or programmed as to set variably the comparison reference levels MR1 and MR2 in dependence on the engine operation state indicated at least by the temperature information of the engine to thereby decrease or lower correctively the comparison reference levels MR1 and MR2 when the temperature information indicates temperature rise of the engine.

The correcting signals M1 and M2 can be made use of for correcting the parameters which bear relation to the function of the knock decision means 23 (or that of the ignition timing correcting means 24) as described below.

Namely, the correcting signal M1 is used for increasing correctively the background level of the input for the knock decision means 23 in order to compensate for increase of the ion current with a view to evading erroneous knock detection. Similarly, the correcting signal M2 is made use of for decreasing correctively the gain of the amplifier circuit incorporated in the band-pass filter 14A so as to compensate for increase of the ion current for thereby avoiding erroneous knock detection.

A variety of sensors 28 including the crank angle sensor 1 described hereinbefore are designed to detect various parameters such as the engine temperature and others. The output signals of these sensors 28 are supplied to the electronic control unit 20.

On the other hand, a variety of actuators 29 operatively connected to the electronic control unit (ECU) 20 is driven under the control by the control signals issued by the electronic control unit 20 in dependence on the engine operation states as determined by the electronic control unit 20 on the basis of the sensor signals.

At this juncture, it should be mentioned that input/output interfaces, D/A (digital-to-analogue) converter(s) and A/D (analogue-to-digital) converter(s) are interposed between the electronic control unit (ECU) 20 on one hand and the band-pass filter 14A, the ignition circuit 40, the various sensors 28 and the various actuators 29 on the other hand, although they are omitted from illustration in the drawings.

Next, description will be made in more concrete of the operation of the knock suppression control apparatus according to the first embodiment of the invention shown in FIG. 1.

As described previously, when the ignition signal P is generated by the electronic control unit (ECU) 20, a high voltage generated by the ignition circuit 40 is applied to the spark plug 8 to bring about electric discharge across the gap of the spark plug 8, whereby the air-fuel mixture within the engine cylinder is fired.

Further, a portion of the ignition energy is charged in the ion current detection circuit 10 as source for the bias voltage. This bias voltage is applied to the spark plug 8 by way of the ignition circuit 40, whereby ions produced upon combustion of the air-fuel mixture are caused to migrate. Thus, the ion current i (see FIG. 3) flows from one electrode to the other of the spark plug.

The ion current i is detected by the ion current detection circuit 10 as the ion current detection voltage signal Ei from which the knock signal Kj is extracted by means of the band-pass filter 14A to be supplied to the integrating circuit 16, whereby the first integral signal Km is obtained. On the other hand, the ion current detection voltage signal Ei outputted from the ion current detection circuit 10 is also supplied to the second integrating circuit 16A to be outputted as the second integral signal Em. Both the first and second integral signals Km and Em are converted into digital signals, respectively, which are then inputted to the electronic control unit (ECU) 20.

Every time the first and second integral signals Km and Em are received, the electronic control unit 20 resets the integrating circuits 16 and 16A. Parenthetically, it should be mentioned that the A/D conversion processing of integration data and the reset processing of the individual integrating circuits 16 and 16A are carried out every ignition cycle of the engine.

The comparison level setting means 26 fetches the comparison reference values for the first and second integral signals Km and Em, respectively, from the map data set previously as described hereinbefore, to thereby correct these comparison reference values by taking into account at least the temperature information (e.g. temperatures of the intake air and the engine cooling water) for thereby determining arithmetically the first and second comparison reference levels MR1 and MR2, respectively.

In general, it is known that the magnitude of the ion current tends to decrease when the engine is in the high temperature state (i.e., when the engine temperature is higher than a predetermined one). Accordingly, in case the engine is in the high-temperature state, the reference values determined by referencing the map data is correctively determined to thereby set optimally the comparison reference levels MR1 and MR2.

Of course, the comparison reference values MR1 and MR2 can be corrected similarly by taking into account the other sensor output information which may exert influence to the detection of the ion current.

At this juncture, it should again be mentioned that the reference value map data referenced for determining the comparison reference levels MR1 and MR2 include the data which bear relation at least to one of the engine operation state and the engine load and contain mean values of the first and second integral signals Km and Em, respectively, in the standard operation state of the engine (i.e., on the presumption that the spark plug 8 is of the standard structure and that the fuel is not admixed with any additive containing ionizable substance(s) such as Na, K or the like).

The correcting quantity arithmetic means 25 compares the comparison reference levels MR1 with the digital value of the first integral value Km while comparing the comparison reference level MR2 with that of the second integral value Em, respectively, whereby the correcting quantities (correcting coefficients) are determined by the correcting quantity arithmetic means 25 on the basis of the results of the comparisons, e.g. ratios or differences between the first integral signal Km and the comparison reference level MR1 and between the second integral value Em and the comparison reference level MR2. Thus, the correcting signals M1 and M2 conforming to the correcting quantities are outputted from the correcting quantity arithmetic means 25.

By way of example, let's assume that an additive which contains substance(s) which is likely to be ionized is admixed to the fuel. Then, the first and second integral signals Km and Em increase remarkably than the respective comparison reference values MR1 and MR2. In that case, the parameters relevant to the knock decision means 23 (or the ignition timing correcting means 24) have to be corrected to a large extent.

Consequently, in the above assumed case, the correcting quantity arithmetic means 25 corrects the background level for the knock decision means 23 with the correcting signal M1 so that the background level increases while correcting the amplification gain of the amplifier circuit incorporated in the band-pass filter 14A with the correcting signal M2 so that the gain decreases.

Further, when the fuel is admixed with the additive which is likely to be ionized as mentioned above, the correcting quantity arithmetic means 25 sets large values for the correcting quantities in order to compensate for a large increase of the ion current.

In this manner, the background level which is set for the knock decision means 23 on the basis of the value resulting from the averaging processing of the first integral signal Km is incremented correctively by a predetermined quantity on the basis of the correcting signal M1.

As mentioned previously, the sooting state detecting means 27 is so designed as to detect occurrence or non-occurrence of the leak current due to the sooting at the spark plug 8 (i.e., due to the lowering of the insulation resistance) on the basis of the level of the current signal Gi outputted from the ion current detection circuit 10.

When it is detected that the level of the current signal Gi is greater than a predetermined value (i.e., when the leak current is detected), the sooting state detecting means 27 outputs the sooting state detection signal Q to thereby inhibit the arithmetic operation for determining the correcting quantities (M1; M2) on the basis of the second integral value Em of the ion current detection voltage signal Ei.

As is known in the art, when the leak current due to the sooting state of the spark plug 8 is detected, the second integral value Em can not properly be determined because of superposition of the leak current on the ion current.

Thus, the correcting quantity arithmetic means 25 is inhibited to perform the correcting quantity arithmetic operation on the basis of the second integral value Em in response to the sooting state detection signal Q, and thus only the correcting quantity arithmetic based on the first integral signal Km is carried out.

In more concrete, the sooting state detecting means 27 fetches the current signal Gi indicating the leak current during the exhaust stroke of the concerned cylinder (i.e., cylinder being monitored) and compares the signal Gi with the predetermined value for the leak current decision. When the level of the sooting state detection signal Q reaches or exceeds the predetermined value, it is then decided that the spark plug of the concerned cylinder is in the sooting state.

In this way, by providing the correcting quantity arithmetic means 25, the relevant parameters can be so corrected as to cancel out the increase of the ion current with the correcting signals M1 and M2 upon detection of increase of the ion current due to the admixture of the additive with the fuel and/or retrofitting of the spark plug of the standard structure by the nonstandard one.

By virtue of the feature described above, both the knock detection and the knock suppression control can be performed with the same hardware/software structure (i.e., without need for changing or modifying the hardware/software structure) regardless of whether the standard fuel or additive-admixed fuel is used or whether or not the spark plug is retrofit, whereby improved knock detection and knock suppression controllability can be ensured.

On the other hand, when the sooting phenomenon takes place in the spark plug 8 to incur abnormal increase of the second integral value Em of the ion current detection voltage signal Ei, the correcting quantity arithmetic performed by the correcting quantity arithmetic means 25 can be executed on the basis of the first integral value Km of the knock signal Kj, which means that the knock suppression control can be carried out with enhanced safety and reliability.

Parenthetically, in conjunction with the knock suppression control apparatus according to the first embodiment of the present invention, description has been made on the presumption that the increase of the ion current is to be canceled out or compensated for. However, decrease of the ion current may occur due to structural difference such as difference in the electrode structure, for example, between the standard spark plug and the retrofit one or for the like reason. The teachings of the present invention is equally effective for the compensation for such decrease of the ion current.

By way of example, when the second integral value Em (or the first integral signal Km) is smaller than the predetermined comparison reference level, the correcting quantity arithmetic means 25 decreases correctively the knock decision reference level for the knock decision means 23 with the correcting signal M1 so that the reference level is lowered. On the other hand, the correcting quantity arithmetic means 25 increases correctively the gain of the amplifier circuit incorporated in the band-pass filter 14A with the correcting signal M2.

In this manner, even in the case of decrease of the ion current for the reason mentioned above, deviation component(s) of the ion current can be compensated for, whereby high reliability can be ensured for the knock decision and the knock suppression control.

Incidentally, it should be mentioned that the first integrating circuit 16 may be so designed as to integrate the half-waves of positive polarity of the knock signal Kj or alternatively to perform full-wave integration. In the latter case, an absolute value circuit will have to be provided in association with the integrating circuit. Further, as the integrating period of the integrating circuit 16, a period extending from 15 to 65 ATDC (after the top dead center) in terms of the crank angle of the engine may be selected, because probability of occurrence of the knock event is relatively high during this period.

Further, in the foregoing description, it has been assumed that magnitude or intensity of the knock is determined on the basis of the first integral value Km of the knock signal Kj. However, it goes without saying that the peak value of the knock signal Kj, duration of the knock vibration, the number of pulses obtained by shaping the knock signal Kj with a predetermined level or the like may equally be employed as the information indicating the magnitude or intensity of the knock.

In FIG. 1, the circuit configuration of the knock suppression control apparatus is shown for only one cylinder. However, it is obvious that the correction control of parameters for all the cylinders of a multi-cylinder type engine can be executed on the basis of the information relevant to each of the cylinders by employing the similar control circuit means including the correcting quantity arithmetic means 25.

It is known that when the spark plug 8 is in the sooting state, the leak current contains lots of high-frequency vibration components, as a result of which the vibration components may erroneously be detected as the knock signal Kj, incurring degradation of S/N ratio of the knock signal Kj.

Accordingly, in order to realize and sustain optimal ignition timing correction by suppressing the erroneous correction based on the erroneous knock detection, the sooting state detecting means 27 may be so designed as to inhibit the knock decision of the knock decision means 23 when the sooting state detection signal Q exceeds a predetermined upper limit level while setting the ignition timing correcting quantity at a predetermined value.

The correction control taught by the present invention may be carried out on the basis of the first integral signal Km and the second integral value Em for each of the individual cylinders or for each cylinder group including a predetermined number of cylinders. In that case, the sooting state detecting means 27 may be so designed or programmed as to inhibit the knock decision of the knock decision means 23 only for the specific one of the individual cylinders or for the specific cylinder group.

Although the foregoing description has been made on the presumption that the sooting state detecting means 27 makes decision as to occurrence of the leak current on the basis of the sooting state detection signal Q (the ion current) during the exhaust stroke of the cylinder being subjected to the control, the sooting state detecting means 27 may be so designed as to decide occurrence of the leak current in dependence on whether or not the second integral value Em exceeds a predetermined value during a predetermined period, starting from energization of the ignition coil incorporated in the ignition circuit 40.

Further, in the case of a V-type engine, the correction control may be carried out for each cylinder group by performing the correction control on a bank basis by making use of the information obtained for each bank. Furthermore, in the multi-cylinder type engine, similar correction control may be carried out on a cylinder-by-cylinder basis.

Embodiment 2

In the case of the knock suppression control apparatus according to the first embodiment of the invention, increase of the output level of the ion current is decided on the basis of both the first and second integral signals Km and Em. However, such decision may equally be made on the basis of only one of the first integral value Km and the second integral value Em.

In the case where the influence of the sooting state of the spark plug 8 is only to a negligible extent, it is possible to decide increase of the output level of the ion current on the basis of only the second integral value Em of the ion current detection voltage signal Ei.

Further, in the case where high accuracy is not required for the detection of the ion current, increase of the output level of the ion current can be decided only with the first integral signal Km. In that case, the first integral signal Km destined for use for the knock decision can be made use of in the ion current decision process. Accordingly, the second integrating circuit 16A and the A/D converter 18 can then be spared, which is of course preferable for simplification of the circuit configuration and cost reduction.

Embodiment 3

In the knock suppression control apparatus according to the first embodiment of the invention, both the background level (knock decision reference level) for the knock decision means 23 and the gain of the amplifier circuit incorporated in the band-pass filter 14A are corrected with the correcting signals M1 and M2. However, the objects of the present invention can equally be achieved by correcting either the background level for the knock decision means 23 or the amplification gain for the band-pass filter 14A with the correcting signals M1 and M2.

Further, as the parameter(s) for the correction, there may be mentioned other parameters relevant to the knock decision means 23 or the ignition timing correcting means 24 such as, for example, the ion current amplification factor of the ion current detection circuit 10, the integration coefficient of the first integrating circuit 16 and the ignition timing correcting quantity for the ignition timing correcting means 24 which depends on the knock magnitude or intensity.

Embodiment 4

In the knock suppression control apparatus according to the first embodiment of the invention described hereinbefore, the first integral signal Km and the second integral signal Em are straightforwardly inputted to the correcting quantity arithmetic means 25 after having been converted into the digital values by the A/D converters 17 and 18, respectively. However, mean values of these integral signals may preferably be supplied to the correcting quantity arithmetic means 25.

Figure 2:
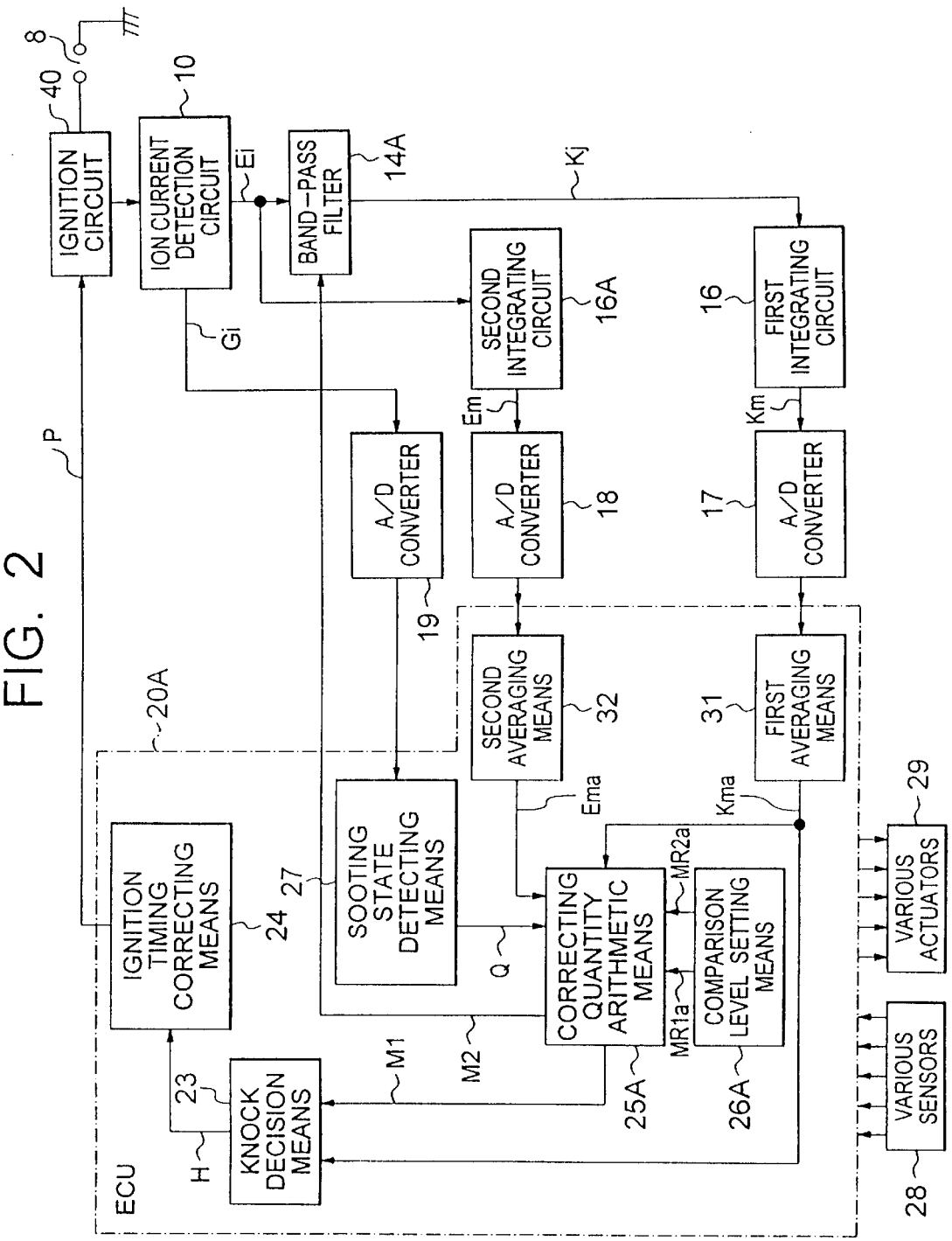
FIG. 2 is a schematic diagram showing generally an arrangement of a knock suppression control apparatus for an internal combustion engine according to a fourth embodiment of the present invention.

FIG. 2 is a block diagram showing generally and schematically the knock suppression control apparatus according to a fourth embodiment of the present invention which is provided with averaging means. Incidentally, parts or components same as or equivalent to those described hereinbefore by reference to FIG. 1 are denoted by like reference characters and detailed description thereof will be omitted.

Referring to FIG. 2, in the knock suppression control apparatus according to the instant embodiment of the invention, there are provided an electronic control unit (ECU) 20A, a correcting quantity arithmetic means 25A and a comparison level setting means 26A which functionally correspond, respectively, to the electronic control unit 20, the correcting quantity arithmetic means 25 and the comparison level setting means 26 described hereinbefore.

Referring to FIG. 2, a first averaging means 31 provided at the output side of the A/D converter 17 is so designed as to perform an averaging processing (temporal filter arithmetic processing per se known in the art) on the first integral signal Km supplied from the A/D converter 17, whereby a first mean integral value Kma is outputted from the first averaging means 31 to be inputted to the knock decision means 23 and the correcting quantity arithmetic means 25A.

More specifically, the first mean integral value Kma can arithmetically be determined in accordance with the following expression (1):

$$Kma = Km(n-1)(1-Kf) + Km(n)Kf \tag{1}$$

where Km(n−1) represents the value of the first integral signal Km in the preceding cycle, Km(n) represents the value of the first integral signal Km in the current cycle, and Kf represents the filter arithmetic coefficient which is set in a range given by 0<Kf<1.

Similarly, a second averaging means 32 which is connected to the A/D converter 18 is so designed as to perform an averaging processing on the second integral signal Em supplied from the A/D converter 18, whereby a second mean integral value Ema is outputted from the second averaging means 32 to be inputted to the correcting quantity arithmetic means 25A. The second mean integral value Ema can arithmetically be determined in accordance with the expression analogous to the expression (1).

The comparison level setting means 26A sets first and second comparison reference levels MR1a and MR2a for the first and second mean integral values Kma and Ema, respectively, while the correcting quantity arithmetic means 25A outputs the correcting signals M1 and M2 on the basis of results of comparisons of the first and second mean integral signals Kma and Ema with the first and second comparison reference levels MR1a and MR2a, respectively.

More specifically, the correcting quantity arithmetic means 25A is designed to determine arithmetically the correcting quantities indicated by the correcting signals M1 and M2 on the basis of addition or sum of a first comparison-resultant value corresponding to a ratio (or difference) between the first mean integral signal Kma and the first comparison reference level MR1a on one hand and a second comparison-resultant value corresponding to a ratio (or difference) between the second mean integral value Ema and the second comparison reference level MR2a on the other hand.

In more concrete, the correcting quantity SR can be determined by multiplying the comparison-resultant values (e.g. the ratios Kma/MR1a and Ema/MR2a) by mutually different coefficients α and β, respectively, whereon the products resulting from the multiplications are added. Namely, $$SR = (Kma/MR1a)\alpha + (Ema/MR2a)\beta \tag{2}$$

where the multiplication coefficients α and β are set to values which satisfy the conditions that α+β=1, where 0<α<1 and 0<β<1.

As can be seen from the above expression (2), when the ratios between the mean integral values and the comparison reference levels are employed, the correcting quantity arithmetic means 25A generates neither the correcting signal M1 nor M2 when the correcting quantity SR is equal to 1 (one). On the other hand, when SR>1, the correcting quantity arithmetic means 25A generates the correcting signals M1 and M2 in order to compensate for increase of the ion current. On the other hand, when SR<1, the correcting quantity arithmetic means 25A generates the correcting signals M1 and M2 for compensating for decrease of the ion current.

The correcting quantity SR may be reflected in both the correcting signals M1 and M2 or alternatively it may be reflected in only one of the correcting signals M1 and M2. In other words, it is sufficient that operation of at least one of the knock decision means 23 and the band-pass filter 14A undergoes correction by the correcting signal M1 or M2 so long as the overall correcting quantity indicated by the correcting signals M1 and M2 coincides with the correcting quantity SR.

By virtue of the arrangement that the correcting quantity SR is arithmetically determined on the basis of the first and second mean integral values Kma and Ema, as described above, varying or fluctuating components contained in the first integral signal Km and the second integral signal Em can be suppressed, whereby the knock decision as well as the knock suppression control can be realized with enhanced reliability on the basis of the correcting quantity of high stability and reliability.

By way of example, when the sooting state of the spark plug 8 is detected, the level of the second integral signal Em increases, as a result of which reliability of the second integral signal Em lowers when compared with that of the first integral signal Km. In that case, the multiplication coefficient α for the first comparison reference value may be set to a large value with the multiplication coefficient β for the second comparison reference value being set to a small value. In this way, much enhanced reliability can be ensured for the knock suppression control.

In the foregoing description of the knock suppression control apparatus according to the fourth embodiment of the invention, it has been assumed that the correcting quantity arithmetic is realized by using both the first mean integral value Kma and the second mean integral value Ema. However, it goes without saying that the correcting quantity SR may arithmetically be determined by using either the first mean integral value Kma or the second mean integral value Ema because even when the components varying as a function of time lapse can be suppressed, whereby reliability of the knock decision and the knock suppression control can equally be enhanced.

Many features and advantages of the present invention are apparent from the detailed description and thus it is intended by the appended claims to cover all such features and advantages of the knock suppression control apparatus which fall within the true spirit and scope of the invention. Further, since numerous modifications and combinations will readily occur to those skilled in the art, it is not intended to limit the invention to the exact construction and operation illustrated and described.

By way of example, the functions of the knock decision means 23, the ignition timing correcting means 24, the correcting quantity arithmetic means 25; 25A, the comparison level setting means 26; 26A and the sooting state detecting means 27 may be implemented softwarewise in the form of a program or program modules which can be executed by the CPU incorporated in the electronic control unit (ECU). In that case, the program as well as the recording medium storing such program may fall within the purview of the present invention.

Accordingly, all suitable modifications and equivalents may be resorted to, falling within the spirit and scope of the invention.

What is claimed is:

1. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, said integrating means including:

first integrating means for arithmetically determining an integral value of said knock signal as a first integral value; and second integrating means for arithmetically determining an integral value of said ion current as a second integral value, wherein said comparison level setting means is so designed as to set first and second comparison reference levels for said first and second integral values, respectively, and wherein said correcting quantity arithmetic means is so designed as to output said correcting signal at least on the basis of result of the comparison between said first integral value and said first comparison reference level or alternatively at least on the basis of result of the comparison between said second integral value and said second comparison reference level.

2. A knock suppression control apparatus for an internal combustion engine according to claim 1, further comprising:

sooting state detecting means for detecting a sooting state of said spark plug on the basis of a current signal detected by said ion current detecting means during a period in which said ion current is not detected, wherein said correcting quantity arithmetic means is so designed as to output said correcting signal on the basis of said second integral value so long as said sooting state of said spark plug is not detected, while outputting said correcting signal on the basis of said first integral value so long as said sooting state of said spark plug is detected.

3. A knock suppression control apparatus for an internal combustion engine according to claim 2, wherein said sooting state detecting means is so designed as to inhibit a knock decision performed by said knock decision means when said current signal exceeds a predetermined upper-limit level while setting said correcting quantity determined by said control quantity correcting means to a predetermined quantity.

4. A knock suppression control apparatus for an internal combustion engine according to claim 1, wherein said knock decision means is so designed as to decide that said internal combustion engine is in a knock state when said first integral value exceeds a knock decision reference level.

5. A knock suppression control apparatus for an internal combustion engine according to claim 1, further comprising:

first averaging means for arithmetically determining a first mean integral value by averaging said first integral value; and second averaging means for arithmetically determining a second mean integral value by averaging said second integral value, wherein said correcting quantity arithmetic means is so designed as to determine arithmetically correcting quantities indicated by said correcting signals on the basis of addition of a first comparison-resultant value corresponding to a ratio or difference between said first mean integral value and said first comparison reference level on one hand and a second comparison-resultant value corresponding to a ratio or difference between said second mean integral value and said second comparison reference level on the other hand.

6. A knock suppression control apparatus for an internal combustion engine according to claim 5, wherein said correcting quantity arithmetic means is so designed as to determine arithmetically said correcting quantity by adding products resulting from multiplications of said first and second comparison-resultant values by mutually different coefficients, respectively.

7. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, wherein said correcting quantity arithmetic means is so designed as to increase correctively a knock decision reference level of said knock decision means with said correcting signal when said integral value reaches or exceeds said comparison reference level.

8. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, wherein said correcting quantity arithmetic means is so designed as to decrease correctively a knock decision reference level of said knock decision means with said correcting signal when said integral value is smaller than said comparison reference level.

9. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, said filter means including:

amplifier means for amplifying said knock signal, wherein said correcting quantity arithmetic means is so designed as to decrease correctively gain of said amplifier means with said correcting signal when said integral value reaches or exceeds said comparison reference level.

10. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, said filter means including:

amplifier means for amplifying said knock signal, wherein said correcting quantity arithmetic means is so designed as to increase correctively gain of said amplifier means with said correcting signal when said integral value is smaller than said comparison reference level.

11. A knock suppression control apparatus for an internal combustion engine including at least one cylinder, an ignition circuit for generating a high ignition voltage in conformance with ignition timing, and a spark plug disposed within said cylinder for generating spark discharge within said cylinder upon application of said high ignition voltage, said knock suppression control apparatus comprising:

ion current detection means for detecting an ion current flowing by way of said spark plug upon combustion of an air-fuel mixture charged in said cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means;

integrating means for arithmetically determining an integral value which corresponds to an output level of said ion current;

comparison level setting means for setting a predetermined comparison reference level for said integral value; and correcting quantity arithmetic means for outputting a correcting signal for correcting parameters relevant to said knock decision means or alternatively relevant to said control quantity correcting means on the basis of result of the comparison between said integral value and said comparison reference level, wherein said comparison level setting means includes map data corresponding to operational characteristics of said internal combustion engine to thereby set variably said comparison reference level by referencing said map data.

12. A knock suppression control apparatus for an internal combustion engine according to claim 11, wherein said comparison level setting means is so designed as to set variably said comparison reference level in dependence on an engine operation state indicated at least by temperature information of said engine.

13. A knock suppression control apparatus for an internal combustion engine according to claim 12, wherein said comparison level setting means is so designed as to decrease correctively said comparison reference level when said temperature information indicates temperature rise of said engine.

14. The knock suppression control apparatus for an internal combustion engine according to claim 11, wherein said operational characteristics of said internal combustion engine correspond to at least engine rotation numbers (rpm) and loads of said internal combustion engine.

* * * * *